United States Patent
Kim et al.

(10) Patent No.: US 11,198,780 B2
(45) Date of Patent: Dec. 14, 2021

(54) ANTISTATIC CARBON COMPOSITE, MOLDED PRODUCT, AND PREPARATION METHOD THEREFOR

(71) Applicant: LG CHEM, LTD., Seoul (KR)

(72) Inventors: Pyeong-Gi Kim, Daejeon (KR); Seokwon Kim, Daejeon (KR); Se Hyun Kim, Daejeon (KR); Tae Hyung Kim, Daejeon (KR); Suk Jo Choi, Daejeon (KR); Dong Hyun Cho, Daejeon (KR)

(73) Assignee: LG CHEM, LTD., Seoul (KR)

(*) Notice: Subject to any disclaimer, the term of this patent is extended or adjusted under 35 U.S.C. 154(b) by 181 days.

(21) Appl. No.: 15/763,674

(22) PCT Filed: Oct. 17, 2016

(86) PCT No.: PCT/KR2016/011633
§ 371 (c)(1),
(2) Date: Jul. 5, 2018

(87) PCT Pub. No.: WO2017/188524
PCT Pub. Date: Nov. 2, 2017

(65) Prior Publication Data
US 2019/0002680 A1 Jan. 3, 2019

(30) Foreign Application Priority Data
Apr. 25, 2016 (KR) .......... 10-2016-0049776

(51) Int. Cl.
| | | |
|---|---|---|
| *C08L 25/06* | (2006.01) | |
| *B29C 70/88* | (2006.01) | |
| *B29C 70/02* | (2006.01) | |
| *C08L 55/02* | (2006.01) | |
| *C08K 3/04* | (2006.01) | |
| *C08K 5/00* | (2006.01) | |
| *B29K 55/02* | (2006.01) | |
| *B29K 105/16* | (2006.01) | |
| *B29K 507/04* | (2006.01) | |

(52) U.S. Cl.
CPC .............. *C08L 25/06* (2013.01); *B29C 70/02* (2013.01); *B29C 70/88* (2013.01); *C08K 3/041* (2017.05); *C08L 55/02* (2013.01); *B29K 2055/02* (2013.01); *B29K 2105/162* (2013.01); *B29K 2507/04* (2013.01); *B29K 2995/0006* (2013.01); *B29K 2995/0087* (2013.01); *B29K 2995/0089* (2013.01); *C08K 5/0008* (2013.01); *C08K 2201/001* (2013.01); *C08K 2201/003* (2013.01); *C08K 2201/004* (2013.01)

(58) Field of Classification Search
CPC .......... C08K 3/041; C08L 25/06; C08L 55/02
See application file for complete search history.

(56) References Cited

U.S. PATENT DOCUMENTS

| | | | |
|---|---|---|---|
| 4,082,894 A * | 4/1978 | Yoshida ................. | B32B 27/08 |
| | | | 428/335 |
| 7,914,720 B2 | 3/2011 | Arai et al. | |
| 8,236,269 B2 * | 8/2012 | Lee ........................ | B82Y 30/00 |
| | | | 423/414 |
| 9,384,871 B2 * | 7/2016 | Rousseaux ............. | H01B 3/442 |
| 9,840,609 B2 * | 12/2017 | Lee ........................ | H05K 9/009 |
| 10,125,243 B2 | 11/2018 | Korzhenko | |
| 2008/0067711 A1 | 3/2008 | Schwemler et al. | |
| 2009/0121196 A1 | 5/2009 | El Bounia | |
| 2009/0305111 A1 | 12/2009 | Arai et al. | |
| 2010/0219551 A1 | 9/2010 | Arai et al. | |
| 2011/0201731 A1 | 8/2011 | Korzhenko et al. | |
| 2012/0145315 A1 | 6/2012 | Knaapila et al. | |
| 2014/0217331 A1 | 8/2014 | Hata et al. | |
| 2015/0147506 A1 | 5/2015 | Korzhenko et al. | |
| 2015/0352818 A1 | 12/2015 | Glotin et al. | |
| 2018/0273703 A1 * | 9/2018 | Rousseaux ............. | C08K 3/042 |

FOREIGN PATENT DOCUMENTS

| | | |
|---|---|---|
| CN | 1950965 A | 4/2007 |
| CN | 101098921 A | 1/2008 |
| CN | 101759987 A | 6/2010 |
| CN | 101768367 A | 7/2010 |
| CN | 103842290 A | 6/2014 |
| CN | 104603184 A | 5/2015 |
| JP | 2009-074072 A | 4/2009 |
| KR | 10-0900658 B1 | 6/2009 |
| KR | 10-2010-0127953 A | 12/2010 |

(Continued)

OTHER PUBLICATIONS

Machine translation of CN 101759987 A, published Jun. 30, 2010. (Year: 2010).*

(Continued)

*Primary Examiner* — Vickey Nerangis

(74) *Attorney, Agent, or Firm* — Dentons US LLP

(57) ABSTRACT

The present invention relates to a carbon composite, which comprises a polymer resin and a carbon material having specific conditions, thereby controlling a dielectric constant. According to the present invention, the carbon composite and a method for controlling a dielectric constant by using the same can be variously applied to a circuit, an electronic material and the like by establishing a correlation between the specific surface area of the carbon material and the dielectric property of the carbon composite.

13 Claims, 2 Drawing Sheets

(56) References Cited

FOREIGN PATENT DOCUMENTS

KR    10-1505063 B1    3/2015

OTHER PUBLICATIONS

Ibrahim, et al., Modern Applied Science, vol. 4, No. 9, Sep. 2010). (Year: 2010).*
Derwent abstract 1976-93549X for JP 76041661 B, published May 26, 1965.*
Database WPI: "Conductive polycarbonate blend and its preparation method", XP-002782652, Thomson Scientific, Jul. 6, 2010 (Corresponds to CN101759987A).
Database WPI: "Carbon nanotube—containing resin article, manufacture thereof, method for improving its electric conductivity by heat treatment, and its application", XP-002782653, Thomson Scientific, Apr. 10, 2009 (Corresponds to JP2009-074072A).
Database WPI: "Electricity conductive heat-generating polymer composition yarns", XP-002782654, Thomson Scientific, Dec. 13, 2010 (Corresponds to KR10-2010-0127953A).

* cited by examiner

[Fig. 1]
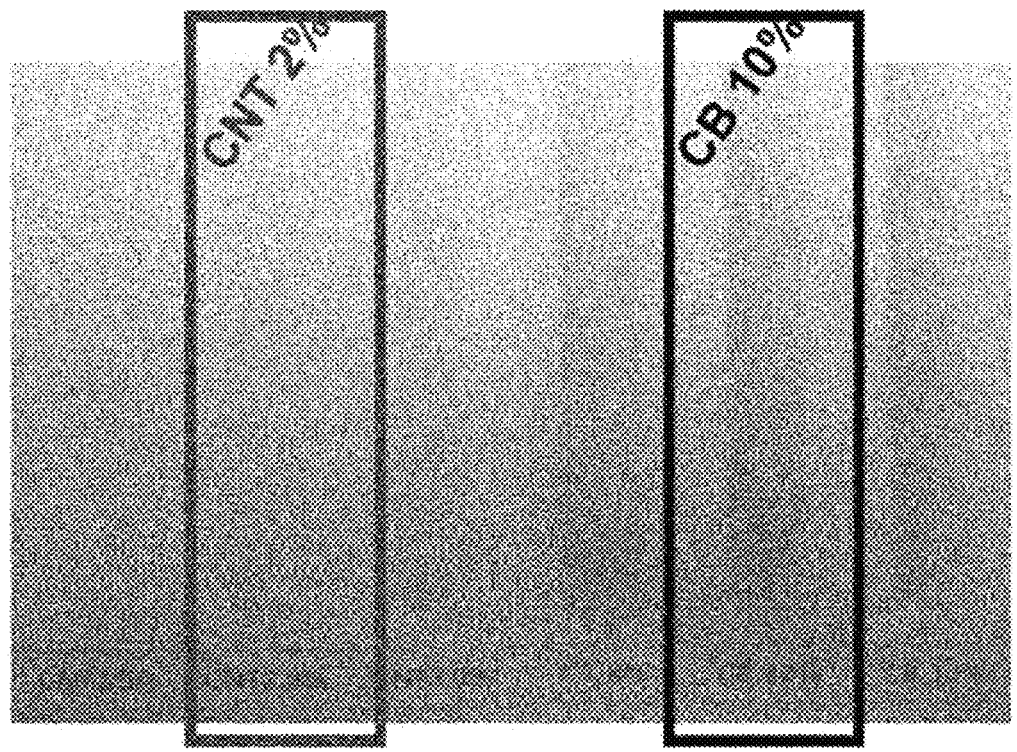

[Fig. 2]
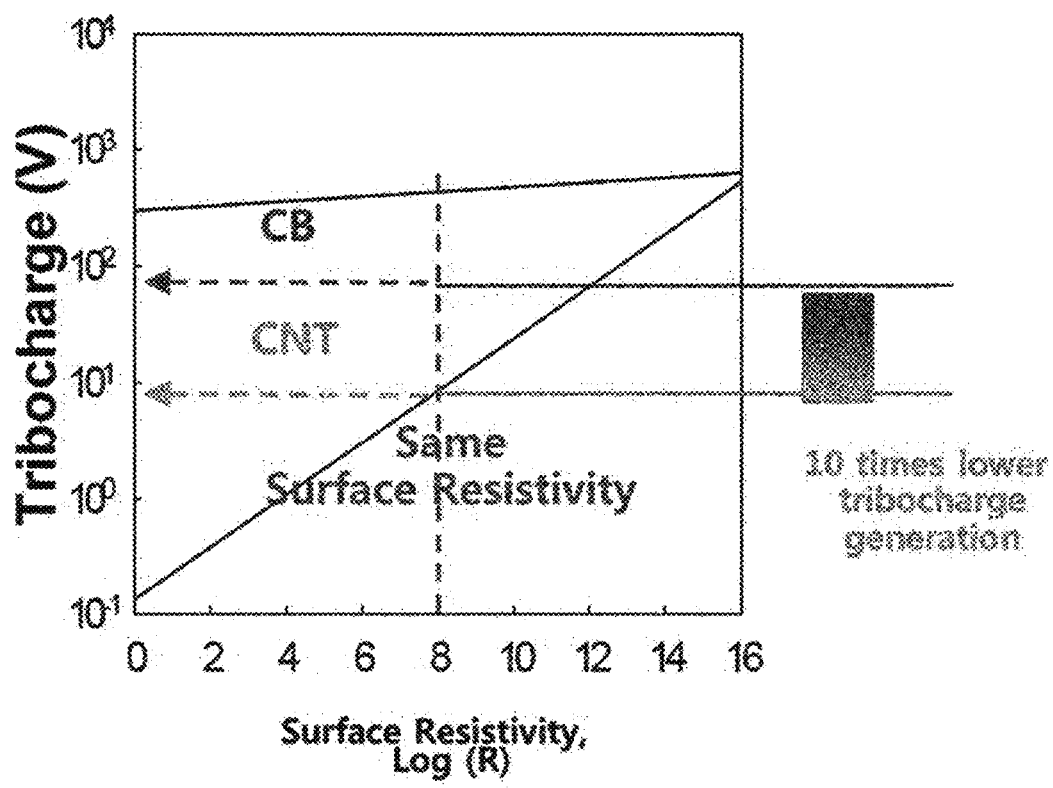
Electrostatic dispersion characteristic of carbon nanotube

ANTISTATIC CARBON COMPOSITE, MOLDED PRODUCT, AND PREPARATION METHOD THEREFOR

BACKGROUND OF THE INVENTION

1. Field of the Invention

This application is a National Stage Entry of International Application No. PCT/KR2016/011633 filed on Oct. 17, 2016, and claims the benefit of Korean Application No. 10-2016-0049776, filed on Apr. 25, 2016, all of which are hereby incorporated by reference in their entirety for all purposes as if fully set forth herein.

The present invention relates to an antistatic carbon composite, a molded product and a preparation method therefor. More particularly, it relates to a composite, a molded product and a preparation method therefor, that allows to improve mechanical properties including electrical conductivity with a low content of carbon materials.

2. Description of the Related Art

In recent years, miniaturization, high integration and high performance of electronic products have been achieved due to the development of the technology of electronic products. Accordingly, electrically conductive materials are used to prevent electrical damage that may occur during transport and storage of materials such as electronic products and parts.

Examples of those used for such applications include a transfer cart for electronic components, a coating material of transfer pipe for electronic components and a thermoforming tray for electronic components (IC tray). They have been used for transferring between manufacturing processes of a semiconductor chip and for packaging after manufacturing. Such trays or the like are determined in size and shape depending on the type or the kind of the semiconductor chip, and they can serve to prevent damage such as electrical shock or the like caused by dust, moisture and the like to a component printed with a circuit or the like. The cart, the pipe tray, and the like may be subjected to a step of heating, for example a step of baking the tray containing the components, in order to remove moisture during the manufacturing process of the components. Therefore, materials for trays and the like are required to have physical properties such as heat resistance, stability and low distortion before and after baking, electrostatic dispersion, surface resistance, electrical conductivity, and low sloughing.

Conventionally, to satisfy the above properties, a material comprising carbon fiber or carbon black has been used.

However, in case that carbon fiber or carbon black is included, there is a limit in improving moldability and low sloughing characteristics. Specifically, the content of the carbon filler is high, so that the moldability is poor and the carbon comes out.

Therefore, research is needed to provide an optimal composition for simultaneously improving physical properties such as strength, low sloughing, surface resistance, and electrostatic dispersion for an antistatic composite material.

SUMMARY OF THE INVENTION

An object of the present invention is to provide an antistatic carbon composite material.

Other object of the present invention is to provide a molded product comprising the carbon composite material.

Another object of the present invention is to provide a method for manufacturing the molded product.

In order to solve the above-described problems, the present invention provides an antistatic carbon composite material, comprising:
a thermoplastic resin; and
0.1 to 10 wt % of carbon nanotubes based on the total weight of the thermoplastic resin;
wherein the thermoplastic resin comprises acrylonitrile-butadiene-styrene copolymer and polystyrene.

The carbon nanotube may have an average particle diameter of 5 nm to 50 nm and an average length of 10 μm to 100 μm.

The content ratio of the acrylonitrile-butadiene-styrene copolymer to the polystyrene may be 1:9 to 8:2.

According to one embodiment, the content of the carbon nanotube may be 0.5 to 3 wt %.

In addition, the carbon nanotube may be in the form of a rigid random coil.

The carbon nanotube may be a single-walled nanotube, a multi-walled nanotube, or mixture thereof.

The thermoplastic resin may further comprise at least one or more selected from the group consisting of a polycarbonate resin, a polypropylene resin, a polyamide resin, an aramid resin, an aromatic polyester resin, a polyolefin resin, a polyester carbonate resin, a polyphenylene ether resin, a polyphenylene sulfide resin, a polysulfone resin, a polyether sulfone resin, a polyarylene resin, a cycloolefin resin, a polyetherimide resin, a polyacetal resin, a polyvinyl acetal resin, a polyketone resin, a polyether ketone resin, a polyether ether ketone resin, a polyaryl ketone resin, a polyether nitrile resin, a liquid crystal resin, a polybenzimidazole resin, a polyparabanic acid resin, a vinyl-based polymer or copolymer resin obtained by polymerizing or copolymerizing at least one vinyl monomers selected from the group consisting of an aromatic alkenyl compound, methacrylic acid ester, acrylic acid ester and a vinyl cyanide compound, a diene-aromatic alkenyl compound copolymer resin, a vinyl cyanide-diene-aromatic alkenyl compound copolymer resin, an aromatic alkenyl compound-diene-vinyl cyanide-N-phenyl maleimide copolymer resin, a vinyl cyanide-(ethylene-diene-propylene(EPDM))-aromatic alkenyl compound copolymer resin, a vinyl chloride resin, a chlorinated vinyl chloride resin.

According to one embodiment, the carbon composite material may further comprise one or more selected from the group consisting of an antimicrobial agent, a releasing agent, a heat stabilizer, an antioxidant, a light stabilizer, a compatibilizer, a dye, an inorganic additive, a surfactant, a nucleating agent, a coupling agent, a filler, a plasticizer, an impact modifier, an admixture, a coloring agent, a lubricant, an antistatic agent, a pigment, a flame retardant agent, and a mixture of one or more of the foregoing.

According to one embodiment, the carbon composite material may have a percolation threshold of 2 to 60 wt % when the carbon nanotubes are added to the thermoplastic resin.

According to another embodiment, the carbon composite material may include an additional conductive filler having a difference in percolation threshold value from 10 to 50 wt % with respect to the carbon nanotubes.

Furthermore, according to the embodiment of the present invention, an antistatic molded product obtained by extruding, injection molding, or a combination thereof of the composite material can be provided.

The molded product may be a transfer cart for electronic components, a coating material of transfer pipe for electronic components, and a thermoforming tray for electronic components.

The impact strength of the molded product may be 7 g·cm/cm or more.

The abrasion resistance of the molded product may be 1% or less.

In addition, according to the present invention, there is provided a method for manufacturing antistatic molded product comprising the steps of:

mixing 0.1 to 10 wt % of carbon nanotubes with thermoplastic resin containing acrylonitrile-butadiene-styrene copolymer and polystyrene; and producing an antistatic molded product by extruding, injection, or a combination thereof, wherein the content ratio of the acrylonitrile-butadiene-styrene copolymer to the polystyrene is from 1:9 to 8:2.

Other specific embodiments of the present invention are included in the following detailed description.

Effect of the Invention

According to the antistatic carbon composite material, the molded product and the method of manufacturing the same according to the present invention, it is possible to simultaneously improve physical properties such as strength, low-sloughing, surface resistance and electrostatic dispersion, so that the present invention can be applied to products requiring strength and electric conductivity.

BRIEF DESCRIPTION OF THE DRAWINGS

FIG. 1 is a photograph showing a result of the abrasion rate evaluation.

FIG. 2 is a graph showing electrostatic dispersion characteristic.

DETAILED DESCRIPTION OF THE INVENTION

The present invention is capable of various modifications and various embodiments, and specific embodiments are illustrated in the drawings and described in detail in the description. It should be understood, however, that the invention is not intended to be limited to the particular embodiments, but includes all modifications, equivalents, and alternatives falling within the spirit and scope of the invention. In the following description of the present invention, a detailed description of known technology in the related arts will be omitted when it is determined that the gist of the present invention may be blurred.

As used herein, the term "composite" may be used interchangeably with "composite material" and "complex" and may be understood to mean a material formed by combining two or more materials.

In addition, the term "molded product" in this specification may be used interchangeably with "processed product" and may be understood as a product formed in a desired shape by applying heat or pressure.

Hereinafter, an antistatic carbon composite material, a molded product and a method of manufacturing the same according to embodiments of the present invention will be described in detail.

The antistatic carbon composite material according to the present invention comprises:

a thermoplastic resin; and 0.1 to 10 wt % of carbon nanotubes based on the total weight of the thermoplastic resin;

wherein the thermoplastic resin comprises acrylonitrile-butadiene-styrene copolymer and polystyrene.

The carbon composite material includes acrylonitrile-butadiene-styrene copolymer and polystyrene as thermoplastic resin, thereby improving physical properties such as moldability and improving low sloughing.

According to one embodiment, the content ratio of the acrylonitrile-butadiene-styrene copolymer to the polystyrene may be 1:9 to 8:2, for example, 1 to 3:5 to 9. In the present invention, the thermoplastic resin comprises the acrylonitrile-butadiene-styrene copolymer and the polystyrene and the content ratio thereof is set as described above, whereby the physical properties such as strength, low sloughing, surface resistance and electrostatic dispersion can be simultaneously improved.

According to one embodiment, the average particle size of the carbon nanotube may be from 5 nm to 50 nm, for example, from 5 nm to 30 nm. If the particle size is small, the rate of increase of the thermal conductivity can be increased. On the other hand, if the particle size is large, the dispersibility deteriorates and the moldability can be affected.

The maximum diameter of the carbon material may be 50 nm. When the carbon material having the maximum diameter is included, it may be included not more than 10 parts by weight based on the total weight of the carbon material, for example 5 parts by weight or less.

According to one embodiment, the average length of the carbon nanotube may be 10 μm to 100 μm. If the average particle diameter or the average length are smaller than the above range, the strength and the moldability may be reduced, and if the average particle diameter and the average length are larger than the above range, the thermal conductivity may increase.

The maximum length of the carbon nanotube may be 100 μm. When the carbon nanotube having the maximum length is included, it may be included not exceeding 20 parts by weight based on the total weight of the carbon nanotube, for example 10 parts by weight or less.

According to one embodiment, the content of the carbon nanotube may be 0.5 to 3 wt %, for example, 1 to 2 wt %. When the content of the carbon nanotube is smaller the above range, the electrical conductivity and the strength may not be sufficiently improved. On the other hand, when the content of the carbon nanotube is excessive, the moldability may be deteriorated.

According to one embodiment, the carbon nanotube may be in the form of a rigid random coil. The carbon nanotube in the form of a rigid random coil can be defined as carbon nanotube that do not undergo elastic deformation caused by thermal energy (kT, where k is the Boltzmann constant and T is the absolute temperature) within the contour length of the used particles because their effective bending modulus is greater than the thermal energy and whose overall particle size (end-to-end distance) is linearly proportional to the square root of the apparent molecular weight.

The carbon nanotube may be a single-walled nanotube, a multi-walled nanotube, or mixtures thereof. For example, only single-walled carbon nanotube may be used, or a combination of single-walled nanotube and multi-walled nanotube may be used. Specifically, the ratio of the single-walled carbon nanotube to the multi-walled carbon nanotube may be 0:100 to 100:0, for example, 10:90 to 90:10.

According to one embodiment, the thermoplastic resin may further comprise at least one selected from the group consisting of but not limited to a polycarbonate resin, a polypropylene resin, a polyamide resin, an aramid resin, an aromatic polyester resin, a polyolefin resin, a polyester carbonate resin, a polyphenylene ether resin, a polyphenylene sulfide resin, a polysulfone resin, a polyether sulfone resin, a polyarylene resin, a cycloolefin resin, a polyetherimide resin, a polyacetal resin, a polyvinyl acetal resin, a polyketone resin, a polyether ketone resin, a polyether ether ketone resin, a polyaryl ketone resin, a polyether nitrile resin, a liquid crystal resin, a polybenzimidazole resin, a polyparabanic acid resin, a vinyl-based polymer or copolymer resin obtained by polymerizing or copolymerizing at least one vinyl monomers selected from the group consisting of an aromatic alkenyl compound, methacrylic acid ester, acrylic acid ester and a vinyl cyanide compound, a diene-aromatic alkenyl compound copolymer resin, a vinyl cyanide-diene-aromatic alkenyl compound copolymer resin, an aromatic alkenyl compound-diene-vinyl cyanide-N-phenyl maleimide copolymer resin, a vinyl cyanide-(ethylene-diene-propylene(EPDM))-aromatic alkenyl compound copolymer resin, polyolefin, a vinyl chloride resin and a chlorinated vinyl chloride resin, and may further include a thermoplastic resin suitably selected by those skilled in the art.

The polyolefin resin may be, for example, polypropylene, polyethylene, polybutylene, and poly(4-methyl-1-pentene), or a combination thereof, but is not limited thereto. In one embodiment, examples of the polyolefin include polypropylene homopolymer (e.g., atactic polypropylene, isotactic polypropylene, and syndiotactic polypropylene), polypropylene copolymer (e.g., polypropylene random copolymer), and mixtures thereof. Suitable polypropylene copolymer includes, but is not limited to, random copolymer prepared by the polymerization of propylene in the presence of comonomers selected from the group consisting of ethylene, but-1-ene (i.e., 1-butene), and hex-1-ene (i.e., 1-hexene). In the polypropylene random copolymer, the comonomers may be present in any suitable amount, but are typically present in an amount of about 10 wt % or less (e.g., from about 1 to about 7 wt %, or from about 1 to about 4.5 wt %).

The polyester resin refers to a homopolyester or copolymer polyester which is a polycondensate of a dicarboxylic acid component skeleton and a diol component skeleton. Representative examples of the homopolyester include polyethylene terephthalate, polypropylene terephthalate, polybutylene terephthalate, polyethylene-2,6-naphthalate, poly-1,4-cyclohexanedimethylene terephthalate, polyethylene diphenylate, and the like. Particularly, polyethylene terephthalate is preferable because it can be used in many applications due to its low price. The copolyester is defined as a polycondensate of at least three components selected from components having a dicarboxylic acid skeleton and components having a diol skeleton, as exemplified below. Examples of the components having a dicarboxylic acid skeleton include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenylsulfone dicarboxylic acid, adipic acid, sebacic acid, dimeric acid, cyclohexane dicarboxylic acid and ester derivatives thereof, and the like. Examples of the components having a glycol skeleton include ethylene glycol, 1,2-propanediol, 1,3-butanediol, 1,4-butanediol, 1,5-pentanediol, diethylene glycol, polyalkylene glycol, 2,2-bis(4'-β-hydroxyethoxyphenyl) propane, isosorbate, 1,4-cyclohexanedimethanol, spiroglycol and the like.

As the polyamide resin, a nylon resin, a nylon copolymer resin, and mixtures thereof can be used. The nylon resin may be polyamide-6 (nylon 6) obtained by ring-opening polymerization of commonly known lactams such as ε-caprolactam or ω-dodecaractam; nylon polymerization products obtainable from amino acids such as aminocaproic acid, 11-aminoundecanoic acid, and 12-aminododecanoic acid; nylon polymers obtainable by polymerization of an aliphatic, alicyclic or aromatic diamine such as ethylenediamine, tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonahexamethylenediamine, meta-xylenediamine, para-xylenediamine, 1,3-bisaminomethylcyclohexane, 1,4-bisaminomethylcyclohexane, 1-amino-3-aminomethyl-3,5,5-trimethyl cyclohexane, bis(4-aminocyclohexyl)methane, bis(4-methylcyclohexyl)methane, 2,2-bis(4-aminocyclohexyl)propane, bis(aminopropyl)piperazine or aminoethylpiperidine, with an aliphatic, alicyclic or aromatic dicarboxylic acid such as adipic acid, sebacic acid, azelaic acid, terephthalic acid, 2-chloroterephthalic acid and 2-methylterephthalic acid; and copolymers or mixtures thereof. Examples of the nylon copolymer includes copolymer of polycaprolactam (nylon 6) and polyhexamethylene sebacamide (nylon 6,10), copolymer of polycaprolactam (nylon 6) and polyhexamethylene adipamide (nylon 66), copolymer of polycaprolactam (nylon 6) and polylauryllactam (nylon 12), and the like.

The polycarbonate resin may be prepared by reacting a diphenol with phosgene, a halogen formate, a carbonic ester, or a combination thereof. Specific examples of the diphenol include hydroquinone, resorcinol, 4,4'-dihydroxydiphenyl, 2,2-bis(4-hydroxyphenyl)propane (also referred to as 'bisphenol-A'), 2,4-bis(4-hydroxyphenyl)-2-methyl butane, bis(4-hydroxyphenyl)methane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hyroxyphenyl)propane, bis(4-hydroxyphenyl)sulfoxide, bis(4-hydroxyphenyl)ketone, bis(4-hydroxyphenyl)ether, and the like. Of these, for example, 2,2-bis(4-hydroxyphenyl)propane, 2,2-bis(3,5-dichloro-4-hyroxyphenyl)propane or 1,1-bis(4-hydroxyphenyl)cyclohexane can be used, and for example 2,2-bis(4-hyroxyphenyl)propane can be used.

The polycarbonate resin may comprise a mixture of copolymers prepared from two or more diphenols. As the polycarbonate resin, there may be used, for exemple a linear polycarbonate resin, a branched polycarbonate resin, or a polyester carbonate copolymer resin.

Examples of the linear polycarbonate resin include a bisphenol-A type polycarbonate resin and the like. Examples of the branched polycarbonate resin include those prepared by reacting a polyfunctional aromatic compound such as trimellitic anhydride, trimellitic acid and the like with a diphenol and a carbonate. The polyfunctional aromatic compound may be contained in an amount of 0.05 to 2 mol % based on the total amount of the branched polycarbonate resin. Examples of the polyester carbonate copolymer resin include those prepared by reacting a difunctional carboxylic acid with a diphenol and a carbonate. As the carbonate, there may be used, for example diary! carbonate such as diphenyl carbonate, ethylene carbonate and the like.

As the cycloolefin-based polymer, there may be exemplified ethylene-cycloolefin copolymers available under the trade name "Apel" (Mitsui Chemicals), norbornene-based polymers available under the trade name "Aton" (JSR), and norbornene-based polymers available under the trade name "Zeonoa" (Nippon Zeon).

According to one embodiment, among the polymer resins, at least one selected from polycarbonate, polyacrylonitrile-butadiene-styrene, polyester carbonate, polypropylene and polyolefin may be used. For example, at least one selected the group consisting of a polyethylene resin, a polyamide resin, a polyester resin, a polycarbonate resin, a polyarylate resin, and a cyclopolyolefin resin can be used.

According to one embodiment, dielectric properties can be effectively controlled by setting the weight ratio of the carbon nanotube and the thermoplastic resin to 1:10 to 1000, for example, 1:10 to 100, for example, 1:50 to 100.

According to one embodiment, the carbon composite material may have a percolation threshold of 2 to 60 wt % when the carbon nanotubes are added to the thermoplastic resin. Here, the "threshold value of percolation" is used to indicate the content (% by weight) of the conductive filler when the volume resistivity of the resin is thoroughly changed from the insulating region to the conductive region by adding the conductive filler to the resin.

The carbon nanotube may include two or more of different carbon nanotubes having a difference in percolation threshold value within a range of 10 to 50 wt %.

According to another embodiment, the carbon composite material may further include an additional conductive filler having a difference in percolation threshold value from 10 to 50 wt % with respect to the carbon nanotubes.

The conductive filler may be fine graphitized fibers having a fiber diameter of 3.5 to 120 nm, fine graphite fibers having a fiber diameter of 120 to 500 nm, carbon fibers having a fiber diameter of 3 to 12 μm, or carbon particles having a diameter of 1 to 500 μm.

Further, when the total amount of the conductive filler in the resin is in the range of 10 to 20 mass %, the change in the volume resistivity of the resin composite may be in a range of $10^{x\pm1}$ Ωcm ($2 \leq X \leq 11$).

According to one embodiment, the carbon composite material according to the present invention may further comprise at least one additive selected from the group consisting of an antimicrobial agent, a releasing agent, a heat stabilizer, an antioxidant, a light stabilizer, a compatibilizer, a dye, an inorganic additive, a surfactant, a nucleating agent, a coupling agent, a filler, a plasticizer, an impact modifier, an admixture, a coloring agent, a lubricant, an antistatic agent, a pigment, a flame retardant agent, and a mixture of one or more of the foregoing.

Such an additive may be included within a range that does not affect the physical properties such as impact strength and electromagnetic wave shielding performance of the composite and the molded product according to the present invention, and may be included in an amount of 0.1 to 5 parts by weight, for example 0.1 to 3 parts by weight based on 100 parts by weight of the polymer resin.

The antistatic carbon composite material of the present invention can be applied to an antistatic product which requires strength and electric conductivity by forming a molded product by extrusion, injection or extrusion and injection. However, a method for producing the molded product can be suitably used as long as it is a conventional method used in the art, and is not limited to the above description.

Specifically, according to the present invention, there may be provided a method for manufacturing antistatic molded product comprising the steps of:

mixing 0.1 to 10 wt % of carbon nanotubes with thermoplastic resin containing acrylonitrile-butadiene-styrene copolymer and polystyrene; and producing an antistatic molded product by extruding, injection, or a combination thereof, wherein the content ratio of the acrylonitrile-butadiene-styrene copolymer to the polystyrene is from 1:9 to 8:2.

Examples of the molded product that can be formed by the above-described method include, but are not limited to, a transfer cart for electronic components, a coating material of transfer pipe for electronic components, and a thermoforming tray for electronic components.

According to one embodiment, the molded product may, for example, have impact strength of 7g·cm/cm or more and abrasion resistance of 1% or less. The impact strength may be defined as Izod impact strength, and may be measured by an experimental method according to the specification of ASTM D256.

The present invention will be explained in more detail with reference to the following examples, including comparative examples. However, these examples are provided for illustrative purposes only and are not intended to limit the scope of the invention.

Examples 1 to 3 and Comparative Examples 1 to 3:
Manufacturing of Carbon Composite Material The carbon material under the conditions shown in Table 1 was used to prepare respective carbon composite material.

As the carbon nanotube, a multi-wall carbon nanotube Nanocyl NC7000 having an average particle diameter of 10 nm and an average length of 1 μm was used.

As the carbon black, KETJENBLACK EC-600JD (trade name, manufactured by Lion Akzo Co., Ltd.) was used.

As the carbon fiber, HTA-CMF-0160-OH (hereinafter, also referred to as CF1; trade name, manufactured by TOHO TENAX Co., Ltd.) and HTA-CMF-0040-OH (hereinafter, also referred to as CF2; trade name, manufactured by TOHO TENAX Co., Ltd.) were used.

TABLE 1

| | Thermoplastic resin | Content ratio of thermoplastic resin | Carbon material | Content of carbon material (wt %) | Percolation threshold (%) |
|---|---|---|---|---|---|
| Example 1 | ABS, polystyrene | 2:8 | Carbon nanotube | 1.0 | 3 |
| Example 2 | ABS, polystyrene | 2:8 | Carbon nanotube | 1.5 | 2.5 |
| Example 3 | ABS, polystyrene | 2:8 | Carbon nanotube | 2.0 | 2 |
| Comparative example 1 | ABS, polystyrene | 2:8 | Carbon black | 8 | 7 |
| Comparative example 2 | ABS, polystyrene | 2:8 | Carbon black | 10 | 7 |
| Comparative example 3 | ABS, polystyrene | 2:8 | Carbon black | 12 | 6 |
| Example 4 | ABS, polystyrene | 2:8 | Carbon nanotube/ Carbon fiber CF1 | 1.5/5 | 3/18 |
| Example 5 | ABS, polystyrene | 2:8 | Carbon nanotube/ Carbon fiber CF2 | 3/5 | 3/50 |

ABS: Acrylonitrile-Butadiene-Styrene copolymer

[Evaluation method of percolation threshold]

Labo Plastomill (trade name, manufactured by Toyo Seiki Seisaku-sho, LTD.) was used for kneading. First, the resin was introduced into the mill. When the resin was melted, carbon nanotube and/or conductive filler were introduced. The kneading was performed under the condition that the resin temperature was 280° C., the mixer rotation speed was 80 rpm, and the kneading time was 10 minutes. The kneaded sample was molded into a flat plate having a size of 100×100×2 mm by melt pressing and its volume resistivity value was measured. The content (% by weight) of the carbon filler that characterizes a dramatic change in volume resistivity from the insulating region to the current conducting region is regarded as percolation threshold.

The resistance value was determined as follows: A silver paste having a resistance lower than that of carbon filler is used. The carbon filler is added to the silver paste to increase the content thereof in the silver paste. The resistance value is estimated based on 100% carbon filler.

The volume resistivity of the molded product was measured by means of an insulation resistance meter (high resistance meter, trade name: R8340, manufactured by ADVANTEST CORPORATION) on a molded product having a volume resistivity of $10^8$ Ω m or more. A 4-probe method (trade name: Loresta HP MCP-T410, manufactured by Mitsubishi Chemical corporation) was used for a molded product having a volume resistivity of $10^8$ Ω m or less.

Preparation Example 1: Production of Specimen of Molded Product

Each carbon composite material in Table 1 was extruded from a twin-screw extruder (L/D=42, φ=40 mm) while raising the temperature profile up to 280° C. to obtain a pellet having a size of 0.2 mm×0.3 mm×0.4 mm.

The prepared pellets were injected in an injector under a flat profile condition of injection temperature 280° C. to prepare specimen of 3.2 mm in size, 12.7 mm in length and in dog-bone form.

Experimental Example 1: Measurement of Surface Resistance According to Thickness The specimen was prepared in the same manner as in Preparation Example 1, except that the thickness of the specimen was changed as shown in Table 2, and the surface resistivity was measured.

The surface resistance value was measured by the method according to the IEC60093 standard, and is shown in Table 2 below. The number means an exponent of base 10, and the unit is (ohm/sq). In the following Table 2, T denotes the sheet thickness, which is expressed in mm, and X means that the measurement range is exceeded.

TABLE 2

|  | 1.0 T | 0.7 T | 0.5 T | 0.3 T | 0.2 T |
|---|---|---|---|---|---|
| Example 1 | 8~X | 11~X | X | X | X |
| Example 2 | 5~6 | 6~7 | 8~9 | 9~12 | X |
| Example 3 | 4~5 | 4~5 | 5 | 6~7 | 7~8 |
| Comparative Example 1 | 7~X | 7~X | 8~X | 10~X | X |
| Comparative Example 2 | 5~6 | 5~6 | 6 | 8~9 | X |
| Comparative Example 3 | 4 | 4 | 4 | 4~5 | 5~6 |

Experimental Example 2: Measurement of Impact Strength

Using the specimen according to Preparation Example 1, the Izod impact strength was measured according to the ASTM D256 standard.

The impact strength values of the specimens according to Example 3 and Comparative Example 2 were measured and the results are shown in Table 3 below.

TABLE 3

|  | Measurement condition | Impact strength (kg · cm/cm) |
|---|---|---|
| Example 3 | ⅛"@ 23° C., notched | 9 |
| Comparative Example 2 | ⅛"@ 23° C., notched | 3 |

Experimental Example 3: Evaluation of Abrasion Resistance

Using the specimen according to Preparation Example 1, the abrasion resistance was evaluated by the method according to the ASTM F510 standard.

The abrasion resistance values of the specimens according to Example 3 and Comparative Example 2 were measured and the results are shown in Table 4 below.

TABLE 4

|  | Run | Abrasion resistance (%) | Average |
|---|---|---|---|
| Example 2 | 1 | 0.64 | 0.65 |
|  | 2 | 0.71 |  |
|  | 3 | 0.59 |  |
| Comparative Example 2 | 1 | 1.40 | 1.35 |
|  | 2 | 1.34 |  |
|  | 3 | 1.32 |  |

In addition, with respect to abrasion resistance, rubbing evaluation was performed for Example 3 and Comparative Example 2.

The rubbing evaluation was carried out by rubbing the specimen 5 times on a white paper, and the results thereof are shown in FIG. 1. From the results shown in FIG. 1, it can be seen that the specimen according to the Example is stronger than the specimen according to the comparative example in terms of the drop-off characteristics of the particles due to abrasion.

Experimental Example 4: Evaluation of Electrostatic Dispersion of Carbon Nanotube The electrostatic dispersion characteristics of carbon black and carbon nanotube were measured by a triboelectric measuring method and the results are shown in FIG. 2.

From the results shown in FIG. 2, it can be seen that the composite material according to the present invention has a tribocharge of at least 10 times lower at the same surface resistance, thereby exhibiting excellent electrostatic dispersion characteristics.

While specific embodiments of the invention have been described in detail, it will be appreciated by those skilled in the art that such detailed descriptions are merely preferred embodiments and the scope of the present invention is not limited thereto. Therefore, the true scope of the present invention should be defined by the appended claims and their equivalents.

What is claimed is:

1. An antistatic carbon composite material, comprising:
   a thermoplastic resin;
   0.1 to 10 wt % of carbon nanotubes based on the total weight of the thermoplastic resin; and
   a conductive filler, wherein the conductive filler is fine graphitized fibers of 3.5 to 500 nm, carbon fibers having a fiber diameter of 3 to 12 μm or carbon particles having a diameter of 1 to 500 μm, and wherein the conductive filler has a difference in percolation threshold value from 10 to 50 wt % with respect to the nanotubtes,
   wherein the thermoplastic resin comprises acrylonitrile-butadiene-styrene copolymer and polystyrene, and
   wherein a content ratio of the acrylonitrile-butadiene-styrene copolymer to the polystyrene is from 1:9 to 2:8.

2. The antistatic carbon composite material according to claim 1, wherein the carbon nanotubes have an average particle diameter of 5 nm to 50 nm and an average length of 10 μm to 100 μm.

3. The antistatic carbon composite material according to claim 1, wherein the content of the carbon nanotubes is 0.5 to 3 wt %.

4. The antistatic carbon composite material according to claim 1, wherein the carbon nanotubes are in the form of a rigid random coils.

5. The antistatic carbon composite material according to claim 1, wherein the carbon nanotubes are a single-walled nanotubes, a multi-walled nanotubes, or a combination thereof.

6. The antistatic carbon composite material according to claim 1, wherein the thermoplastic resin further comprises at least one selected from the group consisting of a polycarbonate resin, a polypropylene resin, a polyamide resin, an aramid resin, an aromatic polyester resin, a polyolefin resin, a polyester carbonate resin, a polyphenylene ether resin, a polyphenylene sulfide resin, a polysulfone resin, a polyether sulfone resin, a polyarylene resin, a cycloolefin resin, a polyetherimide resin, a polyacetal resin, a polyvinyl acetal resin, a polyketone resin, a polyether ketone resin, a polyether ether ketone resin, a polyaryl ketone resin, a polyether nitrile resin, a liquid crystal resin, a polybenzimidazole resin, a polyparabanic acid resin, a vinyl-based polymer or copolymer resin obtained by polymerizing or copolymerizing at least one vinyl monomers selected from the group consisting of an aromatic alkenyl compound, methacrylic acid ester, acrylic acid ester and a vinyl cyanide compound, a diene-aromatic alkenyl compound copolymer resin, a vinyl cyanide-diene-aromatic alkenyl compound copolymer resin, an aromatic alkenyl compound-diene-vinyl cyanide-N-phenyl maleimide copolymer resin, a vinyl cyanide-(ethylene-diene-propylene(EPDM))-aromatic alkenyl compound copolymer resin, a vinyl chloride resin and a chlorinated vinyl chloride resin.

7. The antistatic carbon composite material according to claim 1, further comprising at least one additive selected from the group consisting of an antimicrobial agent, a releasing agent, a heat stabilizer, an antioxidant, a light stabilizer, a compatibilizer, a dye, an inorganic additive, a surfactant, a nucleating agent, a coupling agent, a filler, a plasticizer, an impact modifier, an admixture, a coloring agent, a stabilizer, a lubricant, an antistatic agent, a pigment, a flame retardant agent, and a mixture of one or more of the foregoing.

8. The antistatic carbon composite material according to claim 1, wherein the carbon composite material has a percolation threshold of 2 to 60 wt % when the carbon nanotubes are added to the thermoplastic resin.

9. An antistatic molded product obtained by extrusion, injection, or a combination thereof of the antistatic carbon composite material according to claim 1.

10. The antistatic molded product according to claim 9, wherein the molded product is a transfer cart for electronic components, a coating material of transfer pipe for electronic components, or a thermoforming tray for electronic components.

11. The antistatic molded product according to claim 9, wherein the impact strength of the molded product is 7 g·cm/cm or more.

12. The antistatic molded product according to claim 9, wherein the abrasion resistance of the molded product is 1% or less.

13. A method for manufacturing an antistatic molded product comprising the steps of:
   adding thermoplastic resin containing acrylonitrile-butadiene-styrene copolymer and polystyrene to a mixer to form a mixture and melting the mixture;
   mixing 0.1 to 10 wt % carbon nanotubes based on the total weight of the thermoplastic resin, and conductive filler into the melted mixture; and
   producing an antistatic molded product by extruding, injection, or a combination thereof,
   wherein the content ratio of the acrylonitrile-butadiene-styrene copolymer to the polystyrene is from 1:9 to 2:8 wherein the conductive filler is fine graphitized fibers of 3.5 to 500 nm, carbon fibers having a fiber diameter of 3 to 12 urn or carbon particles having a diameter of 1 to 500 urn, and wherein the conductive filler has a difference in percolation threshold value from 10 to 50 wt % with respect to the carbon nanotubes.

* * * * *